United States Patent [19]

Wetzel

[11] Patent Number: 5,203,002
[45] Date of Patent: Apr. 13, 1993

[54] SYSTEM WITH A MULTIPORT MEMORY AND N PROCESSING UNITS FOR CONCURRENTLY/INDIVIDUALLY EXECUTING 2N-MULTIINSTRUCTION-WORDS AT FIRST/SECOND TRANSITIONS OF A SINGLE CLOCK CYCLE

[76] Inventor: Glen F. Wetzel, 1682 El Cerrito Ct., San Luis Obispo, Calif.

[21] Appl. No.: 457,515

[22] Filed: Dec. 27, 1989

[51] Int. Cl.$^5$ .............................. G06F 9/38; G06F 9/30
[52] U.S. Cl. ........................... 395/800; 364/DIG. 1; 364/231.8; 364/232.2; 364/244.8; 364/247.6; 364/254.1; 395/375
[58] Field of Search ... 364/200 MS File, 900 MS File; 395/375, 800

[56] References Cited

U.S. PATENT DOCUMENTS

| | | | |
|---|---|---|---|
| 3,969,702 | 7/1976 | Tessera | 364/200 |
| 4,050,058 | 9/1977 | Garlic | 364/200 |
| 4,228,498 | 10/1980 | Moshier | 364/200 |
| 4,295,193 | 10/1981 | Pomerene | 364/200 |
| 4,310,879 | 1/1982 | Pandeya | 364/200 |
| 4,314,333 | 2/1982 | Shibayama et al. | 364/200 |
| 4,400,768 | 8/1983 | Tomlinson | 364/200 |
| 4,435,756 | 3/1984 | Potash | 364/200 |
| 4,476,525 | 10/1984 | Ishil | 364/200 |
| 4,507,728 | 3/1985 | Sakamoto et al. | 364/200 |
| 4,574,348 | 3/1986 | Scallon | 364/200 |
| 4,594,655 | 6/1986 | Hao et al. | 364/200 |
| 4,613,953 | 9/1986 | Bush et al. | 364/900 |
| 4,626,989 | 12/1986 | Torii | 364/200 |
| 4,636,942 | 1/1987 | Chen et al. | 364/200 |
| 4,654,788 | 3/1987 | Boudreau et al. | 395/425 |
| 4,709,327 | 11/1987 | Hillis et al. | 364/200 |
| 4,712,175 | 12/1987 | Torii et al. | 364/200 |
| 4,734,852 | 3/1988 | Johnson et al. | 364/200 |
| 4,740,894 | 4/1988 | Lyon | 364/200 |
| 4,752,873 | 1/1988 | Shonai et al. | 364/200 |
| 4,766,566 | 8/1988 | Chuang | 364/900 |
| 4,774,654 | 9/1988 | Pomerene et al. | 364/200 |
| 4,809,169 | 2/1989 | Sarti et al. | 395/800 |
| 4,819,155 | 4/1989 | Wulf et al. | 364/200 |
| 4,833,599 | 5/1989 | Colwell et al. | 364/200 |
| 4,837,676 | 6/1989 | Rosman | 364/200 |
| 4,847,755 | 7/1989 | Morrison et al. | 364/200 |
| 4,855,904 | 8/1989 | Daberkow et al. | 364/200 |
| 4,942,525 | 7/1990 | Shintani et al. | 364/200 |
| 4,954,947 | 9/1990 | Kuriyama et al. | 364/200 |
| 4,967,339 | 12/1990 | Fukumaru et al. | 364/200 |
| 4,989,140 | 1/1991 | Nishimukai et al. | 364/200 |

*Primary Examiner*—Thomas C. Lee
*Assistant Examiner*—Krisna Lim

[57] ABSTRACT

An improved digital processor mechanism capable of executing a plurality of instructions in absolute parallel. Instructions that execute in parallel are grouped into a multi-instruction word. The processor incorporates a multiport memory for storing multi-instructions, addresses and data, and a plurality of arithmetic and logic units to compute both the write address and write data for each instruction. The multiport memory allows a plurality of instruction operands and a plurality of multi-instructions to be fetched in parallel. In addition, the multiport memory allows a plurality of computer data to be written in parallel. A priority instruction multiplexer selects a next multi-instruction from a plurality of multi-instructions thus allowing each multi-instruction, which may include a plurality of different branch addresses, to execute in a single clock cycle.

18 Claims, 3 Drawing Sheets

SYSTEM WITH A MULTIPORT MEMORY AND N PROCESSING UNITS FOR CONCURRENTLY/INDIVIDUALLY EXECUTING 2N-MULTIINSTRUCTION-WORDS AT FIRST/SECOND TRANSITIONS OF A SINGLE CLOCK CYCLE

FIELD OF INVENTION

This invention relates to a digital processor architecture and specifically to a digital processor architecture mechanism which can execute a plurality of instructions in parallel.

DISCUSSION OF PRIOR ART

Advances in processor architecture have progressively improved the execution speed of single threaded programs. Early processor architectures executed programs by completely executing an instruction before beginning execution on the next instruction. Improvements have been made by allowing a subset of instruction, or portions of instructions, to execute in parallel.

The use of a pipeline mechanism allows nondependent portions of each instruction to be executed in parallel with different portions of other adjacent instructions. For example, a pipeline processor could fetch a new instruction while performing an arithmetic operation required by the current instruction. Each instruction begins execution by entering the first pipeline stage. At the same time, the previous instruction enters the next pipeline stage. This movement occurs for all instructions inside the pipe. Completion of instruction execution occurs when the instruction exits the last pipeline stage. There are some well known drawbacks of the pipeline approach. First, each stage of the pipeline performs only a single fixed operation for the instruction. This requires that instructions enter and exit each pipeline stage in a sequential manner. Secondly, the pipeline scheduling mechanism itself adds implementation complexity to the processor. Finally, and most significantly, the execution of any type of branch instruction completely nullifies the pipeline affect. Branch instructions require that future instructions must not enter the pipeline since it is not known which future instruction will execute next. Otherwise, the affects of the all instructions within the pipeline must be reversed. This problem severely reduces the benefits of the pipeline since a significant portion of programs contain branch instruction sequences.

Other processor improvements have included the integration of various memory heirarchies such as programmable registers and caches. The placement of this fast memory next to processing elements reduces the access time of frequently used data and instructions. However, there are some drawbacks with this approach. Programmable registers require a program to have extra instructions to perform load and store operations. Load and store instructions only serve the purpose of duplicating data to different storage areas rather than contributing to desired program results. The time to decode the load and store instructions along with the data transfer time further reduces performance. In addition, hardware to support memory heirarchies is less homogenous and therefore requires an increased implementation complexity.

Recent improvements in processor architecture have increased execution performance even further. U.S. Pat. No. 4,295,193 discloses a machine that allows multiple instructions to be executed in parallel as a single instruction. Instructions are grouped onto a multi-instruction word and executed at the same time. This prior art design has some severe limitations. First, there can only be a maximum of one store operation per group. Second, there can only be a maximum of one branch instruction in a group. As mentioned earlier, a significant portion of programs contain branch instruction sequences.

U.S. Pat. No. 4,833,599 discloses a data processing system that places instructions into a large instruction word for parallel execution. The system described in the patent shows a method and apparatus for performing multiple branch instructions in parallel. This prior art suffers from three significant problems. First, data that is accessed in parallel must be placed in separate memory banks. Otherwise, data that resides in the same bank must be accessed sequentially. Second, a complex scheduling scheme is required to place data in appropriate banks so that the parallel access may occur when needed. Finally, and most significant, this prior art, like that of other conventional processors, sequentially fetches the next instruction after the next instruction branch address has been selected.

The above prior art does not disclose, as in this invention, the sustained execution of multiple instructions that include multiple branch addresses in parallel consistently in one clock cycle. Prior art processors which execute instructions in parallel with multiple branch addresses require multiple clock cycles per instruction cycle. In addition, no prior art discloses the ability to fetch multiple instruction operands while fetching multiple possible next instructions.

OBJECTS AND ADVANTAGES

This processor architecture allows a multiple group of instructions to execute parallel and complete within one clock cycle. Instructions are grouped together by the programmer or compiler (not shown) into a multi-instruction word. Because this processor has a unique execution mechanism for parallel instruction execution as discussed below, it is called the Parallel Access Processor (designated PAP).

A traditional processor controls program execution by a program counter to maintain a single thread of control. Either the program counter is modified by a branch instruction or is automatically incremented to point to the next instruction. As mentioned before, previous art processors fetch the next instruction only after this program counter value or the branch address is determined. This invention utilizes an improved program control mechanism. By having each instruction specify a next multi-instruction branch address, a fetch of a multi-instruction may be performed during the access of instruction operands. Since there are multiple instructions executed each clock cycle, there are multiple next multi-instructions fetched from the multiport memory in absolute parallel. One of these multi-instructions is then selected to be executed next. This mechanism, in effect, eliminates the sequential instruction fetch time. In addition, this mechanism allows program structures with multiple possible next multi-instructions (N-way branch) to be executed within one clock cycle. There are several objects and advantages of the present invention.

This present invention allows instructions to be organized into one multi-instruction without the need of programmable registers.

All instructions and data reside in a multiport memory so that multiple data and instructions may be accessed in absolute parallel.

Each instruction of the multi-instruction word specifies a multi-instruction branch address. The next multi-instruction is selected from all possible next multi-instructions that have been fetched in absolute parallel. This effectively eliminates the need for sequential instruction fetch time.

There is no need for a pipeline since all instructions are executed in absolute parallel.

Any instruction of a multi-instruction may freely read or write to any memory location in absolute parallel. Thereby, banks and complex access methods are not required.

Multiple processors may be connected through the multiport memory to provide extremely high interprocessor communications.

When using only combinational logic ALUs (such as Boolean and integer ALUs), all instructions in the multi-instruction execute within one clock cycle and complete before the next multi-instruction.

Consider the following high level language statements from a program excerpt:

```
.
.
.
a = 5;
b = c + 29;
d = e - f;
if (e == f)
goto 10;
else
if (g < 0)
goto 20;
else
if (g == 96)
goto 50;
.
.
.
```

Since each instruction in this invention allows for both a arithmetic assignment and a conditional branch without the need for programmable registers, a sequence of high level language statements can usually be translated to a minimal sequence of processor instructions. The above sequence of statements can be translated into 5 instructions as follows:

```
1. a = 5;
2. b = c + 29;
3. d = e - f;
   if (e == f)
   goto 10;
4. if (g < 0)
   goto 20;
5. if (g == 96)
   goto 50;
```

Assignment statements can be performed with one instruction as shown by instructions 1 and 2. Load and store instructions are not needed since there are no programmable registers. Conditional branch statements can also be placed into seperate instructions as shown by instructions 4 and 5. Instruction 3 shows a situation where an assignment and conditional branch may be performed on the same operands. Due to the characteristics of this invention, all the above sequence of statements can be grouped into a multi-instruction word and executed in absolute parallel within a single clock cycle. Prior art processors can only partially execute this program sequence in parallel. In addition, prior art processors require multiple clock cycles.

Now consider a string processing example. Suppose that two null terminated fixed size byte strings 'string1' and 'string2' need to be compared. A conventional processor would sequentially compare each byte in the strings one at a time. This requires multiple clock cycles to perform the required comparisons and assignments. Multiple branches would also be required when implemented by means of a loop. In contrast, this invention can perform the full fixed string comparison operation in absolute parallel within one clock cycle. Both multiple comparison operations in addition to independent arithmetic computations and assignments occur within one clock cycle.

Further objects and advantages of this invention will become apparent from a consideration of the drawings and ensuing description.

REFERENCE NUMERALS

Figure 1:
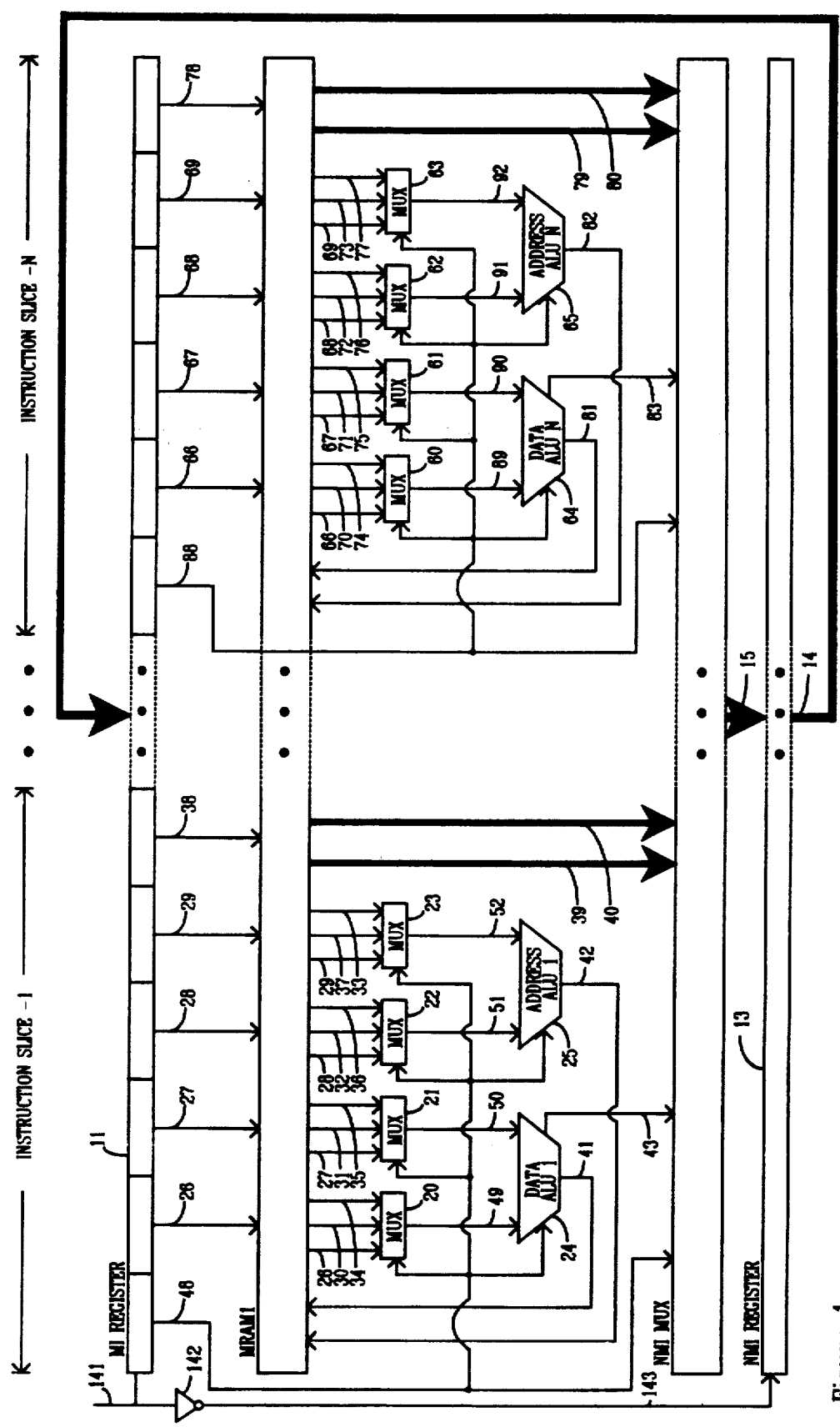
FIG. 1 is a block diagram of the overall structure of a processor in accordance with a preferred embodiment of the invention.

11 Multi-Instruction register (MI register)
12 Multiport Random Access Memory with one level feedback (MRAM1)
13 Next Multi-Instruction register (NMI register)
14 Multi-instruction bus
15 Selected next multi-instruction bus
16 Priority Next Multi-Instruction multiplexer (NMI MUX)
Instruction Slice-1
20 A multiplexer
21 B multiplexer
22 C multiplexer
23 D multiplexer
24 Write data arithmetic logic unit (ALU)
25 Write address arithmetic logic unit (ALU)
26 A address bus
27 B address bus
28 C address bus
29 D address bus
30 data addressed by A
31 data addressed by B
32 data addressed by C
33 data addressed by D
34 data addressed by the data addressed by A
35 data addressed by the data addressed by B
36 data addressed by the data addressed by C
37 data addressed by the data addressed by D
38 Next multi-instruction address bus
39 Next multi-instruction addressed by 38 bus
40 Next multi-instruction addressed by 39 bus
41 Write data bus
42 Write address bus
43 Write data ALU status bus 48 Operation bus
49 A multiplexer to write data ALU connecting bus
50 B multiplexer to write data ALU connecting bus
51 C multiplexer to write address ALU connecting bus
52 D multiplexer to write address ALU connecting bus
Instruction Slice-N
60 A multiplexer
61 B multiplexer
62 C multiplexer
63 D multiplexer
64 Write data arithmetic logic unit (ALU)
65 Write address arithmetic logic unit (ALU)
66 A address bus
67 B address bus
68 C address bus
69 D address bus
70 data addressed by A
71 data addressed by B
72 data addressed by C
73 data addressed by D
74 data addressed by the data addressed by A
75 data addressed by the data addressed by B
76 data addressed by the data addressed by C
77 data addressed by the data addressed by D
78 Next address bus
79 Next multi-instruction addressed by 78 bus
80 Next multi-instruction addressed by 79 bus
81 Write data bus
82 Write address bus
83 Write data ALU status bus
88 Operation bus
89 A multiplexer to write data ALU connecting bus
90 B multiplexer to write data ALU connecting bus
91 C multiplexer to write address ALU connecting bus
92 D multiplexer to write address ALU connecting bus
110 Multiport memory with non-syncronized read/write ports
130 Instruction multiplexer
131 Instruction multiplexer
132 Possible next instruction bus
133 Possible next instruction bus
134 Comparator
135 Comparator
136 Comparator result bus
137 Comparator result bus
138 Priority encoder
139 Priority selector bus
140 Priority instruction multiplexer
141 Clock
142 Clock inverter
143 Inverted clock

DESCRIPTION OF INVENTION

FIG. 1 shows an overall block diagram of the basic processor mechanism. The processor is made up of 1 to N instruction slices, where N is an integer. For clarity, the first and last instruction slices 1 and N are shown. Each instruction slice consists of portions of the Multi-Instruction register 11 (designated MI register), the Multiport Random Access Memory with one level feedback 12 (designated MRAM1), the Priority Next Multi-Instruction Multiplexer 16 (designated NMI MUX) and the Next Multi-Instruction register 13 (designated NMI register). As one can observe, the structure for instruction slices is the same for all slices. Instruction slice-1 contains multiplexers 20, 21, 22, 23, data ALU 24, and write address ALU 25. Duplicate in structure to instruction slice-1, instruction slice-N contains multiplexers 60, 61, 62, 63, data ALU 64, and write address ALU 65. Since each instruction slice is duplicate in structure and operate in absolute parallel with respect to the other instruction slices, discussion will focus on a single instruction slice-1. Referenced objects that perform the same operation in parallel for instruction slice-N will be enclosed in square brackets [].

The MI register 11 is clocked D type register. Clock 141 is connected to provide load timing. For each instruction slice, there are a set of buses connected to the corresponding field output positions of the MI register 11. As shown in FIG. 1, these buses are the operation bus 48 [88], A address bus 26 [66], B address bus 27 [67], C address bus 28 [68], D address bus 29 [69], and the next multi-instruction address bus 38 [78].

Specific bits from the instruction slice operation bus 48 [88] provides control to the write data ALU 24 [64], multiplexers 20 [60], 21 [61], 22 [62], 23 [63], write address ALU 25 [65] and the NMI MUX 16.

Figure 2:
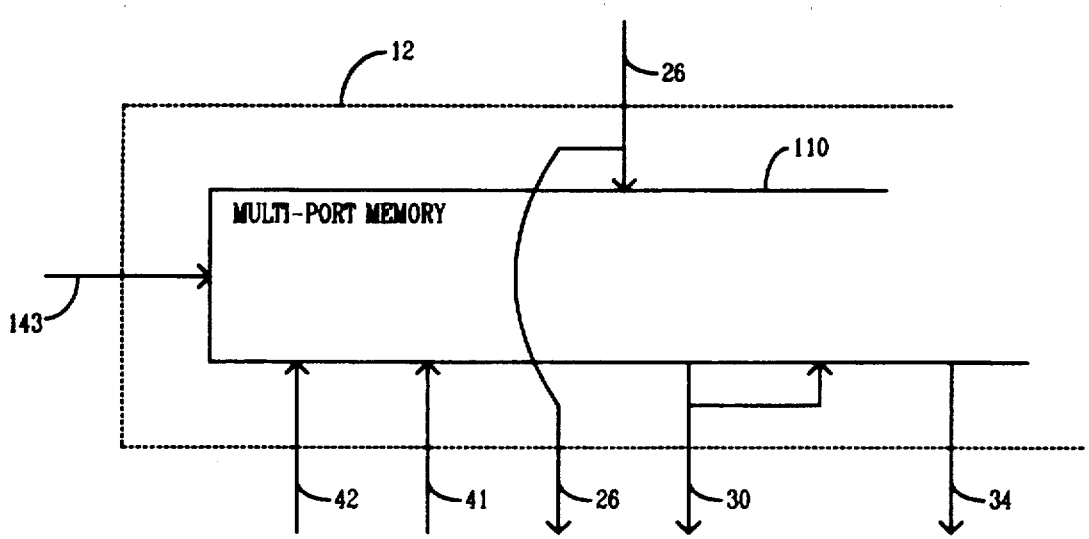
FIG. 2 is the the Multiport Random Access Memory with one level feedback (MRAM1) shown in FIG. 1.

The A address bus 26 [66] is fed into the MRAM1 12 which then provides the data addressed by A on bus 30 [70] and the data addressed by the data addressed by A on bus 34 [74]. As shown by FIG. 2, the derivation of the value A on bus 30 is a basic non-syncronized fetch from multiport memory 110 using address on bus 26. The derivation of the value on bus 34 is a basic non-syncronized fetch from multiport memory 110 using the value on bus 30 as an address. The derived values of 31 [71], 35 [75], 32 [72], 36 [76], 33 [73], 37 [77], 39 [79], and 40 [80] are performed in the same manner and in absolute parallel using 27 [67], 28 [68], 29 [69], and 38 [78] respectively.

As shown in FIG. 1, the values of 26 [66], 30 [70], 34 [74], 27 [67], 31 [71], and 35 [75] are fed into the multiplexers 20 [60] and 21 [67]. Based upon the operation bus 48 [88], multiplexers 20 [60] and 21 [61] each select a value that will go to the write data ALU 24 [64] via buses 49 [89] and 50 [90]. Write data ALU 24 [64] performs the function specified by operation bus 48 [88]. The output of the data ALU 24 [64] is then transferred back to the MRAM1 12 via write data bus 41 [81].

In the same manner used for the write data bus 41 [81] calculation, the write address bus 42 [82] is calculated using the 28 [68], 32 [72], 36 [76], 29 [69], 33 [73], and 37 [77] values. Based upon the operation bus 48 [88], multiplexers 22 [62] and 23 [63] each select a value that will go to the write address ALU 25 [65] via buses 51 [91] and 52 [92]. Write address ALU 25 [65] performs the function specified by operation bus 48 [88]. The output of the write address ALU 25 [65] is then transferred back to the MRAM1 12 via write address bus 42 [82].

The next multi-instruction address 38 [78] bus carries a possible next instruction branch address from the MI register 11 to the MRAM1 12. The MRAM1 12 produces two possible next instructions: the next multi-instruction on bus 39 [79] and instruction addressed by the data addressed by bus 38 [78] on bus 40 [80].

The NMI MUX 16 selects one next multi-instruction from all the 1 to N instruction slice buses 39, 40, 79 or 80. Selection is determined by all the operation buses 48, 88, and the write data ALU status buses 43 and 83. The selected instruction from the NMI MUX 16 is connected to the input of the NMI register 13 via selected next multi-instruction bus 15.

Figure 3:
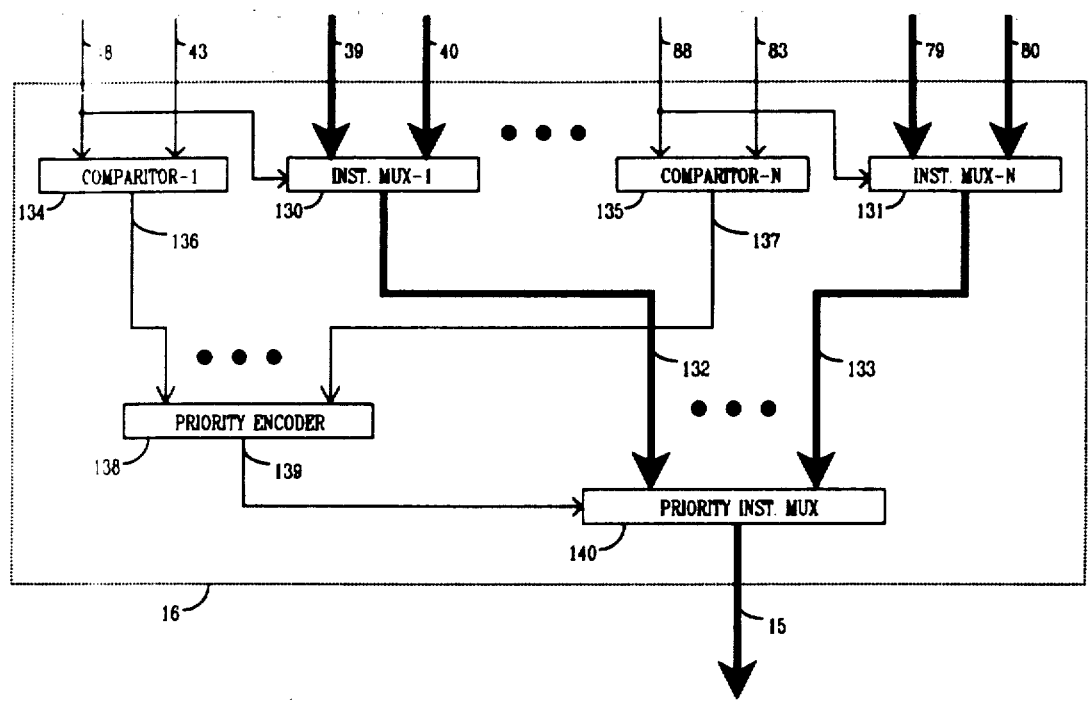
FIG. 3 is the detail priority next instruction multiplexer (NMI MUX) system block diagram shown in FIG. 1.

FIG. 3 shows the detail of the NMI MUX 16. For each instruction slice, each possible next multi-instruction on buses 39, 40, 79 and 80 is fed into the associated instruction multiplexer, 130 and 131. Based upon the operation buses 48 and 88, each instruction slice has an associated multi-instruction multiplexer 130 and 131 which selects a next instruction to place onto the possible next instruction bus 132 and 133. For each instruction slice, comparators 134 and 135 compare control bits on the operation buses 48 and 88 with the write data ALU status buses 43 and 83. The comparators 134 and 135 feed their match information over buses 136 and 137 to the priority encoder 138. The priority instruction multiplexer 140 selects the next instruction from the possible next instructions on buses 132 and 133 based upon the output of the priority encoder 138 via bus 139. The priority instruction multiplexer 140 places the selected instruction on the selected next multi-instruction bus 15.

The NMI register 13 is clock type register which loads the selected instruction from the NMI MUX 16 via the selected next multi-instruction bus 15. The output of the NMI MUX register 13 is placed onto multi-instruction bus 14 to be loaded into the MI register 11. Clock 143 provides load timing.

Clock 141 provides load timing for MI register 11 and is connected to inverter 142 to provide an inverted clock 143. Clock 143 is connected to both the NMI register 13 to provide load timing and the MRAM1 12 to provide write timing.

OPERATION OF INVENTION

Prior to a program being executed, instructions are grouped together by a programmer or compiler (not shown) into multi-instruction word. All instructions in each multi-instruction execute in parallel within one clock cycle. For each clock cycle, an independent multi-instruction initiates and completes execution. There are two phases of the clock cycle: a read phase and a write phase. During the read phase, all instructions access operands from the MRAM1 12 and compute write addresses 42, 82 and write data 41, 81. In addition, possible all next instructions 39, 40, 79, and 80 are accessed from the MRAM1 12. During the write phase, write data on bus 41 and 81 is written to the MRAM1 12 at the addressed location on bus 42 and 82 respectively. At the same time, the selected next multi-instruction is available on multi-instruction bus 14 for execution at the next clock cycle.

Each instruction cycle begins with the loading of a multi-instruction into the MI register 11 controlled by clock 141. The discussion presented below shows the data movements for each transition of the clock 141. During each one of the state transitions, all items are performed at the same time or until the inputs ripple through to outputs. The instruction cycle begins during the LOW to HIGH clock transition:

LOW to HIGH transition

The MI register 11 is loaded with a multi-instruction from the NMI register 13 via multi-instruction bus 14.

During the HIGH state

All instruction fields of the MI register 11 are fed into access ports of the MRAM1 12 via buses 26, 27, 28, 29, 66, 67, 68 and 69 operands.

The MRAM1 12 performs absolute parallel read onto buses 30, 31, 32, 33, 34, 35, 36, 37, 39, 40, 70, 71, 72, 73, 74, 75, 76, 77, 79, 80.

All next possible multi-instructions on buses 39, 40, 79 and 80 are fed into the NMI MUX 16. Based upon the ALU status and control bits from the operation buses 48 and 88, the NMI MUX 16 places the selected next instruction onto the selected next multi-instruction bus 15. The selected next instruction is then available to be loaded into the NMI register 13 on the next transition of the clock.

Multiplexers 20 [60] and 21 [61] select two values from the 26 [66], 27 [67], 30 [70], 31 [71], 34 [74], or 35 [75] inputs based upon the control bits from the operation bus 48 [88]. The two selected values are then fed into the write data ALU 24 [64] which performs an arithmetic or logic operation based upon control bits from the operation bus 48 [88]. The resultant value is then placed on the write data bus 41 [81] to be written into the MRAM1 12 on the next transition of the clock.

Multiplexers 22 [62] and 23 [63] select two values from the 28 [68], 29 [69], 32 [72], 33 [73], 36 [76], or 37 [77] inputs from the MRAM1 12 based upon the control bits from the operation bus 48 [88]. The two selected values are then fed into the write address ALU 25 [65] which performs an operation selected by control bits from the operation bus 48 [88]. The resultant value is placed on the write address bus 42 [82] to be used as the MRAM 12 write address of the value on write data bus 41 [81].

HIGH to LOW transition

Data on all the write data buses 41 [81] are written to the MRAM1 12 at the locations selected by the respective write address buses 42 [82].

The multi-instruction on the selected next multi-instruction bus 15 is latched into the NMI register 13.

During the LOW state

Wait for memory write hold time.

CONCLUSION, RAMIFICATIONS AND SCOPE OF INVENTION

The above detail description should not be construed as limitations on the scope of this invention, but rather as an exemplification of one preferred embodiment thereof. Many other variations are possible. For example, arithmetic logic units 24 and 64 may be enhanced to perform specialized operations such as floating point computations. Suppose there are two vectors A and B which need to be added. Since there are no dependencies between the array elements, the PAP would perform all element additions in parallel. Suppose that another vector, C, needs to be subtracted from vector D. Since there are no dependencies between any of the vectors, the PAP would allow A+B and C−D to be computed in parallel. Now let us say that the vectors A and D need to be added. The PAP would allow all three vector operations (A+B, C−D and A+D) to be computed in parallel. As one could see, the use of floating point ALU's requires multiple clock cycles to every instruction clock cycle. Parallelism is limited by the amount of hardware rather than the PAP organization. For applications that need address computation on different size data items, shifters may also be added to the input of the arithmetic logic units 20 [60], 21 [61], 22 [62], 23 [63].

Another variation would be the connection of multiple processors based upon this preferred architecture. Rather than connecting high bandwidth buses between processors, data and instructions can be shared through the multiport memory. This organization significantly increases interprocessor communication bandwidth while reducing complexity.

Accordingly, the reader will see that this invention provides a significant improvement in processing power over existing processor architectures. This invention executes multiple instructions in parallel, reduces implementation complexity due to homogenous hardware, eliminates the need of programmable registers and fetches all possible next instructions in absolute parallel.

What is claimed:

1. A digital processor for concurrently processing a plurality of instructions in a single clock cycle having at least a first transition and a second transition comprising:
- input register means for receiving and outputting a multiinstruction word having N individually and concurrently executable instructions at said first transition of said single clock cycle, N is an integer greater than 1;
- multiport memory means, coupling to output of said input register means, for storing data and a plurality of said multiinstruction words;
- N processing means, coupling to said multiport memory means, for processing corresponding data outputted from said multiport memory means in response to said multiinstruction word outputted from said input register means, each of said N processing means concurrently and individually calculating a multiport memory write address and generating multiport memory write data for a different one of said N instructions within said multiinstruction word;
- multiplexing means, coupling to said multiport memory means and said N processing means, selectively outputting one of 2N multiinstruction words received from said multiport memory means based upon signals received from said N processing means wherein said multiport memory means outputting said 2N of said multiinstruction words to said multiplexing means in response to the output from said input register means and output from said N processing means; and,
- output register means, coupling to input of said input register means and output of said multiplexing means, for holding said outputted multiinstruction word at said second transition of said single clock cycle.

2. The digital processor as set forth in claim 1, wherein said input register means having N sections for receiving a different one of N instructions within said multiinstruction word.

3. The digital processor as set forth in claim 1, wherein each said processing means having a data processing unit for generating said data and an address processing unit for calculating said address.

4. The digital processor as set forth in claim 3, wherein said data processing unit and said address processing unit operating concurrently.

5. The digital processor as set forth in claim 3, wherein said data processing unit and said address processing unit each coupling to said multiport memory via a plurality of multiplexing units.

6. The digital processor as set forth in claim 1, wherein said 2N multiinstruction words including first N multiinstruction words fetched from said multiport memory means based upon direct next instruction address from each of said N instructions within said multiinstruction word from said input register means.

7. The digital processor as set forth in claim 6, wherein said 2N multiinstruction words further including second N multiinstruction words fetched from said multiport memory means based upon indirect next instruction from each of said N instructions within said multiinstruction word form said input register means.

8. The digital processor as set forth in claim 7, wherein said multiplexing means having N instruction multiplexing means, each said instruction multiplexing means receiving a different one of said first N multiinstruction words and a different one of said second N multiinstruction words and selectively outputting one of the two received multiinstruction words in response to said signal received from one of said N processing means.

9. The digital processor as set forth in claim 8, wherein said multiplexing means having priority instruction multiplexing means coupling to output of said N instruction multiplexing means for selectively outputting one of the N multiinstruction words.

10. A method for concurrently processing a plurality of instructions in a single clock cycle having at least a first transition and a second transition comprising the steps of:
- receiving a multiinstruction word into an input register means at said first transition of said single clock cycle having N individually and concurrently executable instructions, N is an integer greater than 1;
- processing, by N processing means, corresponding data outputted from said multiport memory means in response to said multiinstruction word outputted from said input register means, each of said N processing means concurrently and individually calculating a multiport memory write address and generating multiport memory write data for a different one of said N instructions within said multiinstruction word;
- selectively outputting one of 2N multiinstruction words received from said multiport memory means based upon signals received from said N processing means wherein said multiport memory means outputting said 2N of said multiinstruction words to multiplexing means in response to the output from said input register means and output from said N processing means; and,
- holding said outputted multiinstruction word at said second transition of said single clock cycle in an output register means.

11. The concurrently processing a plurality of instructions method as set forth in claim 10, wherein said receiving step further having a step of receiving a different one of N instructions within said multiinstruction word into said input register means.

12. The concurrently processing a plurality of instructions method as set forth in claim 10, wherein said concurrently and individually calculating further having steps of calculating said write address by an address processing unit and calculating said write data by a data processing unit.

13. The concurrently processing a plurality of instructions method as set forth in claim 12, further both said write address and write data calculating steps are concurrently calculating.

14. The concurrently processing a plurality of instructions method as set forth in claim 12, wherein said calculating write data further having step of selecting different data for said data processing unit and wherein said calculating write address further having step of selecting different data for said address processing unit via a plurality of multiplexing units each coupling to said multiport memory means.

15. The concurrently processing a plurality of instructions method as set forth in claim 10, further comprising a step of fetching 2N multiinstruction words including first N multiinstruction words from said multiport memory means based upon direct next instruction address from each of said N instructions within said multiinstruction word from said input register means.

16. The concurrently processing a plurality of instructions method as set forth in claim 15, wherein said fetching 2N multiinstruction words further including a second N multiinstruction words from said multiport memory means based upon indirect next instruction address from each of said N instructions within said multiinstruction word from said input register means.

17. The concurrently processing a plurality of instructions method as set forth in claim 16, wherein said fetching 2N multiinstruction words further comprising steps of:

selecting one of 2N multiinstruction by N instruction multiplexing means, each said instruction multiplexing means receiving a different one of said first N multiinstruction words and a different one of said second N multiinstruction words; and, selectively outputting one of the two received multiinstruction words in response to said signal received from one of said N processing means.

18. The concurrently processing a plurality of instructions method as set forth in claim 17, wherein said selectively outputting one of the N multiinstruction words by said multiplexing means further having priority instruction multiplexing means coupling to output of said N instruction multiplexing means.

* * * * *